(12) United States Patent
Zuckerberg et al.

(10) Patent No.: US 7,797,256 B2
(45) Date of Patent: Sep. 14, 2010

(54) GENERATING SEGMENTED COMMUNITY FLYERS IN A SOCIAL NETWORKING SYSTEM

(75) Inventors: Mark Zuckerberg, Palo Alto, CA (US); Aaron Sittig, Palo Alto, CA (US); Wayne Chang, Palo Alto, CA (US)

(73) Assignee: Facebook, Inc., Palo Alto, CA (US)

( * ) Notice: Subject to any disclaimer, the term of this patent is extended or adjusted under 35 U.S.C. 154(b) by 1078 days.

(21) Appl. No.: 11/499,093

(22) Filed: Aug. 2, 2006

(65) Prior Publication Data

US 2008/0033739 A1    Feb. 7, 2008

(51) Int. Cl.
*G06Q 99/00*    (2006.01)

(52) U.S. Cl. ....................................... 705/319

(58) Field of Classification Search .................. 705/1.1, 705/319
See application file for complete search history.

(56) References Cited

U.S. PATENT DOCUMENTS

| | | | |
|---|---|---|---|
| 5,937,413 A | 8/1999 | Hyun et al. | |
| 6,029,141 A | 2/2000 | Bezos et al. | |
| 7,013,292 B1 | 3/2006 | Hsu et al. | |
| 7,072,849 B1 | 7/2006 | Filepp et al. | |
| 7,249,123 B2 | 7/2007 | Elder et al. | |
| 7,269,590 B2 | 9/2007 | Hull et al. | |
| 2001/0037721 A1 | 11/2001 | Hasegawa et al. | |
| 2002/0059201 A1 | 5/2002 | Work | |
| 2003/0063072 A1* | 4/2003 | Brandenberg et al. | 345/173 |
| 2003/0145093 A1 | 7/2003 | Oren et al. | |
| 2003/0222918 A1 | 12/2003 | Coulthard | |
| 2003/0225632 A1 | 12/2003 | Tong et al. | |
| 2004/0024846 A1 | 2/2004 | Randall et al. | |
| 2004/0088177 A1 | 5/2004 | Travis et al. | |
| 2004/0148275 A1 | 7/2004 | Achlioptas | |
| 2005/0021750 A1 | 1/2005 | Abrams | |
| 2005/0114759 A1 | 5/2005 | Williams et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171955 A1 | 8/2005 | Hull et al. | |
| 2005/0177385 A1 | 8/2005 | Hull et al. | |
| 2005/0197846 A1 | 9/2005 | Pezaris et al. | |
| 2005/0198020 A1 | 9/2005 | Garland et al. | |
| 2005/0198031 A1 | 9/2005 | Pezaris et al. | |
| 2005/0198305 A1 | 9/2005 | Pezaris et al. | |

(Continued)

OTHER PUBLICATIONS

U.S. Appl. No. 11/639,655, Mark Zuckerberg, Systems and Methods for Social Mapping, filed Dec. 14, 2006.

(Continued)

*Primary Examiner*—Jonathan Ouellette
(74) *Attorney, Agent, or Firm*—Fenwick & West LLP

(57) ABSTRACT

Segmented community flyers are predicated upon segmented communities. Segmented communities are for those web-based users that appreciate the distinction between their "real life" friends in their local geographic communities and their "cyberspace" contacts, many of whom they have never met in person. Further, those web-based users that do appreciate their "real life" friends in their local geographic communities need a way of communicating to many of these "real life" friends at once, without having to spend time preparing and sending multiple emails. Segmented community flyers advantageously accomplish such communication.

20 Claims, 11 Drawing Sheets

U.S. PATENT DOCUMENTS

| | | | |
|---|---|---|---|
| 2005/0203807 | A1 | 9/2005 | Bezos et al. |
| 2005/0216300 | A1 | 9/2005 | Appelman et al. |
| 2005/0216550 | A1 | 9/2005 | Paseman et al. |
| 2005/0235062 | A1 | 10/2005 | Lunt et al. |
| 2005/0256756 | A1 | 11/2005 | Lam et al. |
| 2006/0041543 | A1 | 2/2006 | Achlioptas |
| 2006/0042483 | A1 | 3/2006 | Work et al. |
| 2006/0048059 | A1 | 3/2006 | Etkin |
| 2006/0052091 | A1 | 3/2006 | Onyon et al. |
| 2006/0080613 | A1 | 4/2006 | Savant |
| 2006/0085419 | A1 | 4/2006 | Rosen |
| 2006/0136419 | A1 | 6/2006 | Brydon et al. |
| 2006/0143183 | A1 | 6/2006 | Goldberg et al. |
| 2006/0161599 | A1 | 7/2006 | Rosen |
| 2006/0184617 | A1 | 8/2006 | Nicholas et al. |
| 2006/0190281 | A1 | 8/2006 | Kott et al. |
| 2006/0194186 | A1 | 8/2006 | Nanda |
| 2006/0218225 | A1 | 9/2006 | Hee Voon et al. |
| 2006/0229063 | A1 | 10/2006 | Koch |
| 2006/0230061 | A1 | 10/2006 | Sample et al. |
| 2006/0247940 | A1 | 11/2006 | Zhu et al. |
| 2006/0248573 | A1 | 11/2006 | Pannu et al. |
| 2006/0256008 | A1 | 11/2006 | Rosenberg |
| 2006/0265227 | A1 | 11/2006 | Sadamura et al. |
| 2006/0293976 | A1 | 12/2006 | Nam |
| 2007/0174389 | A1 | 7/2007 | Armstrong et al. |
| 2007/0208916 | A1 | 9/2007 | Tomita |
| 2007/0282987 | A1 | 12/2007 | Fischer et al. |
| 2008/0005076 | A1 | 1/2008 | Payne et al. |
| 2008/0010343 | A1 | 1/2008 | Escaffi et al. |
| 2008/0033776 | A1 | 2/2008 | Marchese |
| 2008/0040428 | A1 | 2/2008 | Wei et al. |
| 2008/0070697 | A1 | 3/2008 | Robinson et al. |
| 2008/0086458 | A1 | 4/2008 | Robinson et al. |

OTHER PUBLICATIONS

U.S. Appl. No. 11/646,206, Aaron Sittig, Systems and Methods for Generating a Social Timeline, filed Dec. 26, 2006.

U.S. Appl. No. 11/493,291, Mark Zuckerberg, Systems and Methods for Dynamically Generating a Privacy Summary, filed Jul. 25, 2006.

U.S. Appl. No. 11/701,698, Jed Stremel, System and Method for Digital File Distribution, filed Feb. 2, 2007.

U.S. Appl. No. 11/713,455, Jed Stremel, Systems and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, filed Feb. 2, 2007.

U.S. Appl. No. 11/502,757, Andrew Bosworth, Systems and Methods for Generating Dynamic Relationship-Based Content Personalized for Members of a Web-Based Social Network, filed Aug. 11, 2006.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, Systems and Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/726,962, Charlie Cheever, System and Method for Confirming an Association in a Web-Based Social Network, filed Mar. 23, 2007.

U.S. Appl. No. 11/701,744, Andrew Bosworth, System and Method for Curtailing Objectionable Behavior in a Web-Based Social Network, filed Feb. 2, 2007.

U.S. Appl. No. 11/796,184, Jared S. Morgenstern, System and Method for Giving Gifts and Displaying Assets in a Social Network Environment, filed Apr. 27, 2007.

U.S. Appl. No. 11/893,797, Yun-Fang Juan, System and Method for Invitation Targeting in a Web-Based Social Network, filed Aug. 16, 2007.

U.S. Appl. No. 11/893,820, Yun-Fang Juan, Systems and Methods for Keyword Selection in a Web-Based Social Network, filed Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072,003, Arieh Steinberg, Systems and Methods for Implementation of a Structured Query Language Interface in a Distributed Database Environment, filed Feb. 21, 2008.

U.S. Appl. No. 12/077,070, Dave Fetterman, Systems and Methods for Network Authentication, filed Mar. 13, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction Based Polling, filed May 28, 2008.

U.S. Appl. No. 12/151,734, Jared Morgenstern, Systems and Methods for Classified Advertising in an Authenticated Web-Based Social Network, filed May 7, 2008.

U.S. Appl. No. 12/154,886, Nico Vera, Systems and Methods for Providing Privacy Settings for Applications Associated with a User Profile, filed May 27, 2008.

U.S. Appl. No. 60/965,624, Adam D'Angelo, Systems and Methods for Targeting Advertisements in a Social Network Environment, filed Aug. 20, 2007.

U.S. Appl. No. 11/893,559, Adam D'Angelo, Platform for Providing a Social Context to Software Applications, filed Aug. 15, 2007.

U.S. Appl. No. 60/967,842, Ezra Callahan, Systems and Methods for Dynamically Updating Privacy Settings, filed Sep. 7, 2007.

U.S. Appl. No. 60/966,442, Ezra Callahan, system and Method for Incorporating an Entity or Group other than a Natural Person into a Social Network, filed Aug. 28, 2007.

U.S. Appl. No. 60/965,852, Adam D'Angelo, Systems and Methods for Advertising, filed Aug. 22, 2007.

U.S. Appl. No. 61/005,614, Yishan Wong, Systems and Methods for Community Translations on a Web-Based Social Network, filed Dec. 5, 2007.

U.S. Appl. No. 12/080,808, Peter Deng, Systems and Methods for Calendaring, filed Apr. 2, 2008.

Flores, Fernando et al. "Computer systems and the design of organizational interaction." in ACM Transactions on Information Systems (TOIS), vol. 6, Issue 2, Apr. 1988.

Chipin. Chipin: The easy way to collect money [online], 15 Dec. 15, 2006 http://web.archive.org/web/20061215090739/www.chipin.com/overview.

Parzek, E. Social Networking to Chipin to a Good Cause [online]. Business Design Studio, Jun. 29, 2006 http://www.businessdesignstudio.com/resources/blogger/2006/06social-networking-tochipin-to-good.html.

\* cited by examiner

300

Registration

Register for College
Register for High School

To register for Facebook, just fill in the fields below. You will have a chance to enter additional information and submit a picture once you have registered.

302 ⟶ Name:

304 ⟶ Status: [ Undergrad ▼ ]

306 ⟶ Email: (school)

You can choose any password. It should not be your school password.

308 ⟶ Password:

310 ⟶ Word in the box:

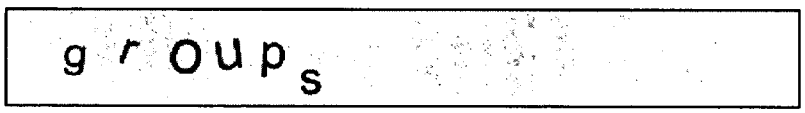

 I have read and understood the Terms of Use, and I agree to them.

312 ⟶ Register Now!

Social Network – random people at uc davis

Displaying 5 people from your social network.

next

| | | | |
|---|---|---|---|
| 708 → | Name: Virginia Vaughn ← 702<br>Status: Undergrad ← 704<br>Year: 2007<br>Field: Psychology ← 706 | Send Message<br>Poke Them!<br>View Friends<br>View Photos<br>Add to Friends | |

Name: William Fogarty Medina
Status: Undergrad
Year: 2007
Field: Economics

Send Message
Poke Him!
View Friends
View Photos
Add to Friends

Name: Mai Nguyen
Geo: Sacramento, CA
Status: Alumnus/Alumna
Year: 2005
Field: Sociology Send Message
Poke Her!
View Friends
View Photos
Add to Friends Name: Sara Tanaka
Status: Undergrad
Year: 2006
Field: Clinical Nutrition Send Message
Poke Her!
View Friends
View Photos
Add to Friends Name: Eileen Magtibay
Status: Undergrad
House: Sigma Omicron Pi
Field: English Send Message
Poke Her!
View Friends
View Photos
Add to Friends

Facebook Flyers
What are Facebook Flyers?

Save time and money by using Facebook Flyers. We display your Flyer 10,000 times for only $5!*

Now you can post Flyers with photos! Include a friend's profile picture, add from your albums or upload a photo of your choice.

Examples: Flyer Board.   Questions? Flyers FAQ.

What should your Flyer say?

| | | | Flyer Preview ← 810 |
|---|---|---|---|
| 802 → | Theme: | Basic ▼ | UC Davis Flyer |
| 804 → | Picture: | No Picture ▼ | Your Title Here |
| | | Add Photo | The body of your Flyer goes here. |
| | Friend: | Start typing a friend's nam | Posted by Brian Bathurst |
| | | ← 810 | |
| | Event: | Choose from My Events ▼ | |
| 806 → | Title: | | |
| | | (max 25 characters) | |
| 808 → | Body: | [text area] | |
| | | (max 200 characters) | |
| 812 → | Link: | Enter a web or Email address: (optional) | |
| 814 → | Posted by: | ☑ Show my name. | |

816 → Where should your Flyer be posted?

| School | How Many Flyers Per Day? | Days | Total Flyers | Total Price | ← 820 |
|---|---|---|---|---|---|
| UC Davis [remove] | 30,000 Flyers - $15 ▼ | 3 ▼ | 90,000 Flyers | $45 | |

Add more schools: UC Davis ▼  Add

818 →  Start posting Flyer:  Right now    On this date: (mm/dd/yyyy)

Attention:
U.C. Davis

Happy Birthday Cahill!

You're finally...19!

Hope you have a great birthday!

Click here for directions to Cahil's Birthday Party:
www.cahilhome.com

Posted by Anonymous

GENERATING SEGMENTED COMMUNITY FLYERS IN A SOCIAL NETWORKING SYSTEM

CROSS-REFERENCE TO RELATED APPLICATIONS

The present application incorporates by reference U.S. Provisional Patent Application Ser. No. 60/750,844 filed on Dec. 14, 2005 for "Systems and Methods for Social Mapping," U.S. Provisional Patent Application Ser. No. 60/753,810 filed on Dec. 23, 2005 for "Systems and Methods for Social Timeline," and U.S. patent application Ser. No. 11/493,291 filed on Jul. 25, 2006 for "Systems and Methods for Dynamically Generating a Privacy Summary."

BACKGROUND OF THE INVENTION

1. Field of the Invention

The present invention relates generally to web-based social network communication, and more particularly to systems and methods for dynamically generating segmented community flyers.

2. Description of Related Art

For many people, the Internet represents the principal way in which they meet new friends and remain in touch with their existing friends. Therefore, it is not surprising that the number of people spending large amounts of their free time on the Internet is growing at an alarming rate. Many of these people are failing to appreciate the distinction between their "real life" friends in their local geographic communities and their "cyberspace" contacts, many of whom they have never met in person. As a result, Internet users are now finding they would like to pay more attention to their "real life" friends.

Further, those people who do appreciate their "real life" friends in their local geographic communities need a way of communicating to many of those friends at once without having to spend time preparing and sending multiple emails. There is therefore a need for systems and method for dynamically generating segmented community flyers.

SUMMARY OF THE INVENTION

Exemplary systems and methods for dynamically generating segmented community flyers are provided. An exemplary system according to one embodiment comprises a server configured with a web-based social network database, the web-based social network database further comprising a plurality of web-based social network database records configured to represent a segmented community. A segmented community flyer setting engine coupled to the web-based social network database generates a segmented community flyer for the segmented community.

An exemplary method comprises receiving one or more flyer settings selections from a member of a segmented community, previewing a segmented community flyer incorporating the one or more flyer settings selections, and generating a segmented community flyer based on the one or more flyer settings selections. The exemplary method further comprises displaying the segmented community flyer to the segmented community.

BRIEF DESCRIPTION OF THE DRAWINGS

FIG. 3 shows a screen shot of an exemplary registration screen for a segmented community;

FIG. 7 shows a screen shot of an exemplary segmented community social network;

FIG. 8 shows an exemplary flyer settings selections screen;

DETAILED DESCRIPTION OF THE INVENTION

Systems and methods for dynamically generating segmented community flyers are provided. Segmented community flyers are predicated upon segmented communities. According to one embodiment, segmented communities are comprised of web-based social network members located within a narrow geographic area, such as a particular school, college, town or company. Next, a segmented community member selects flyer settings. The segmented community member may preview a segmented community flyer based on the flyer settings selections, make changes, and then generate the segmented community flyer. The segmented community flyer is then displayed to members of selected segmented communities for a predetermined number of displays commencing at a predetermined time.

Figure 1:
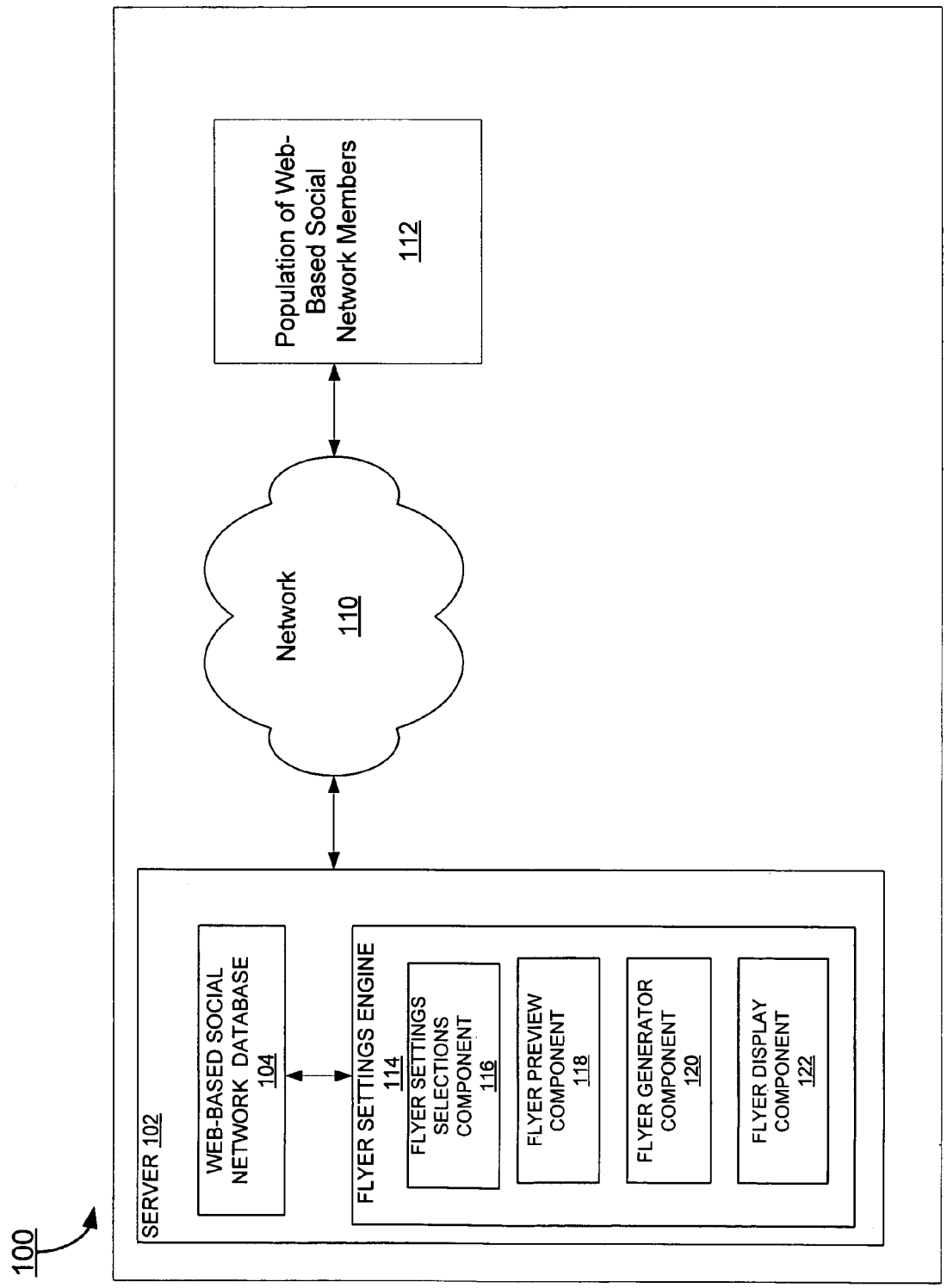
FIG. 1 shows an exemplary network architecture for dynamically generating a segmented community flyer.

FIG. 1 shows an exemplary network architecture 100 for dynamically generating a segmented community flyer. The simplified network architecture 100 includes a server 102, a network 110, and a population of web-based social network members 112. The server 102 further comprises a web-based social network database 104 and a flyer settings engine 114.

Web-based social network database 104 is a database of any entity that provides web-based social networking services, communication services and/or dating services. The web-based social network database 104 comprises a plurality of web-based social network database records configured to represent a segmented community. A segmented community according to one embodiment is a separate, exclusive or semi-exclusive web-based social network wherein each authenticated segmented community member accesses and interacts with other members of their respective segmented community.

The population of web-based social network members 112 comprises the members of one or more segmented communities. According to some embodiments, a segmented community is comprised of web-based social network members located within a narrow geographic area, such as a particular school, college, town or company. A segmented community promotes local networking by limiting member interactions to those members of a particular segmented community. A segmented community helps preserve the look and feel of a small, secure, closely networked community by promoting offline "real life" interactions among the segmented community members. Segmented community flyers further these efforts in some embodiments by facilitating effective and efficient communication within a segmented community. Further, the members of a particular segmented community are more likely to care about and pay attention to a segmented community flyer generated from within their segmented community and directed to their segmented community.

A flyer settings engine 114 is coupled to the web-based social network database 104. Flyer settings engine 114 further comprises a flyer settings selections component 116. Flyer settings selections component 116 receives the flyer settings selections from a segmented community member. According to some embodiments, the flyer settings selections component 116 accesses the web-based social network database 104 in order to provide certain flyer settings selections tailored for the particular segmented community member who is entering the flyer settings selections. For instance, the flyer settings selections component 116 may insert a particular segmented community name from web-based social network database 104 into the flyer settings selections.

The flyer settings engine 114 comprises a flyer preview component 118. Once the flyer settings selections are made by a segmented community member, the flyer preview component 118 creates a preview of a segmented community flyer for the segmented community member.

The flyer settings engine 114 further comprises a segmented community flyer generator component 120 and a flyer display component 122. The segmented community flyer generator component 120 utilizes the received flyer settings selections in the flyer settings selections component 116 to generate a segmented community flyer. The segmented community flyer generator component 120 then forwards the generated segmented community flyer to the flyer display component 122 for display to a segmented community selected by a segmented community member.

It will readily be appreciated by one of ordinary skill in the art that there are multiple possible combinations and locations for the herein described component software and hardware. For example, web-based social network database 104 may also function as a standalone application, separate from flyer settings engine 114. Further, a number of commonly known communications mechanisms can be used for server 102 to communicate across network 110. Network 110 may include an Internet network and/or other wireless or wired networks such as mobile device carrier networks.

Figure 2:
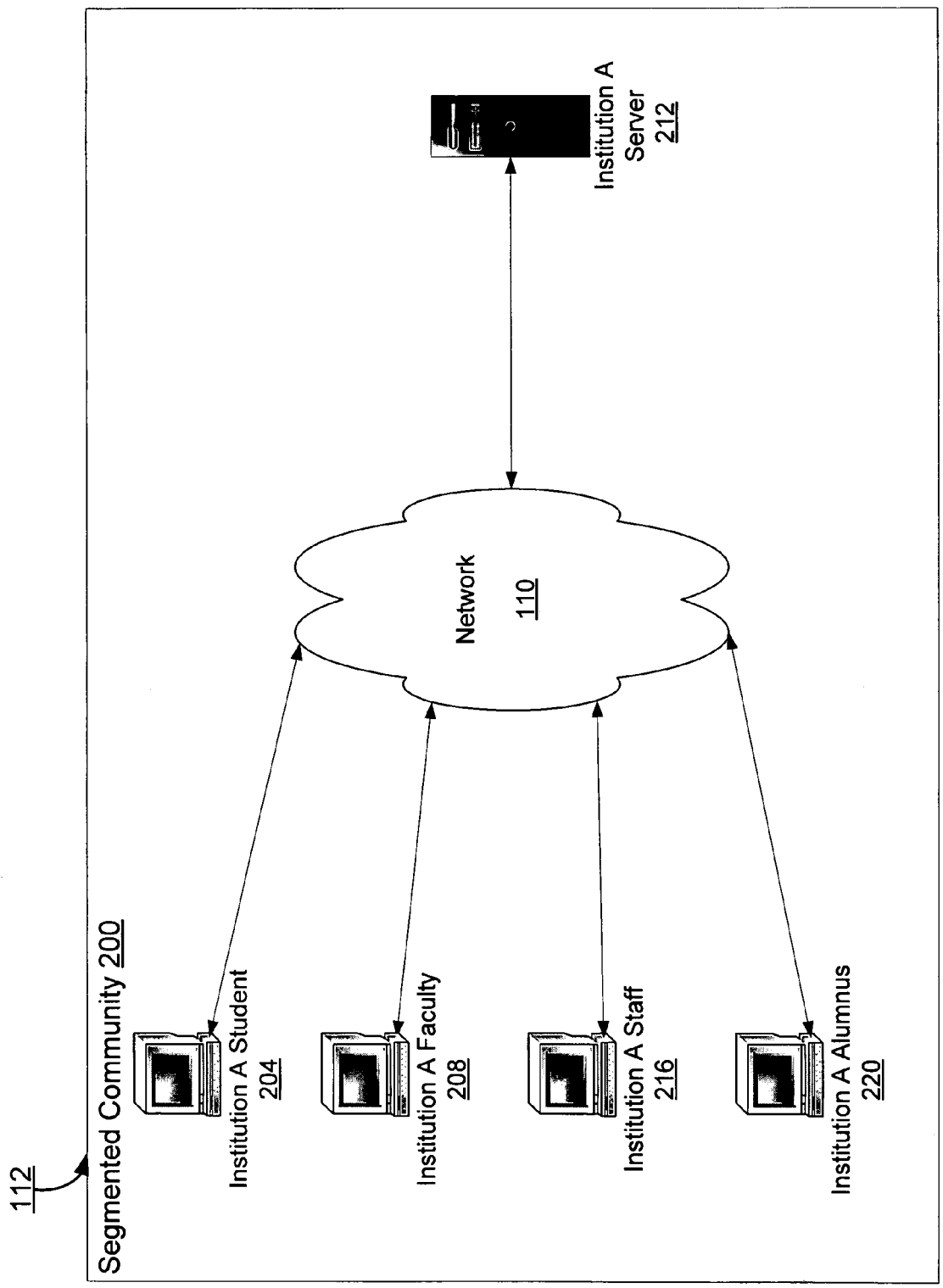
FIG. 2 shows an exemplary segmented community.

Turning to FIG. 2, an exemplary segmented community 200 is shown. A segment of the population of web-based social network members 112 comprises the members of exemplary segmented community 200. The web-based social network database 104 (FIG. 1) comprises a plurality of web-based social network database records configured to represent a segmented community, such as exemplary segmented community 200.

The exemplary segmented community 200 shown in FIG. 2 corresponds to a particular institution of higher learning, referred to in FIG. 2 as institution "A." An institution of higher learning may represent any post-junior high school educational institution, including a high school, college, or university. According to one embodiment, a segmented community comprises members of a geographically-associated community. In further embodiments, a segmented community may comprise members of a particular church group, military unit, fraternity, sorority, company, or similar group.

Exemplary segmented community 200 comprises one or more students 204, faculty 208, staff 216 and/or alumni 220 of institution "A." According to one embodiment, a segmented community member may select privacy settings based on category of segmented community member, as described in U.S. patent application Ser. No. 11/493,291 filed on Jul. 25, 2006 for "Systems and Methods for Dynamically Generating a Privacy Summary," and incorporated herein by reference. For example, with respect to exemplary segmented community 200, a segmented community member may select privacy settings based on whether a segmented community member is a student member, faculty member, staff member or alumni member. For example, a student segmented community member of exemplary segmented community 200 may desire that only other students in the segmented community be allowed to access and view information about that particular student. Accordingly, that student may select privacy settings that will not allow non-student segmented community members (i.e. faculty, staff and alumni of institution "A") to access and view information about that student.

An institution "A" server 212 communicates with the segmented community 200 via network 110. According to one embodiment, institution "A" server 212 is associated on network 110 with a unique identifier or top-level domain ("TLD") name. For example, the institution "A" server 212 can be associated on network 110 with the unique identifier or TLD of harvard.edu. Any type of identifier or designation is within the scope of embodiments contemplated herein.

Email addresses corresponding to email accounts hosted by a server of a particular segmented community such as institution "A" are used to identify the TLD of the segmented community. For example, students at Harvard University with email addresses in a format of studentname@harvard.edu will have the TLD of Harvard.edu. In exemplary embodiments, the TLD of a particular segmented community can be used at least in part as an authentication mechanism to authenticate an affiliation of a person with a particular segmented community.

Turning to FIG. 3, a screen shot of an exemplary registration screen 300 for a segmented community is shown. The registration screen 300 is accessed by users in a population of web-based users wishing to join or register for a particular segmented community. For example, a Harvard University student can use the exemplary registration screen 300 to register for the segmented community for people affiliated with Harvard University. In the particular example shown in FIG. 3, a person having a name of Joe Smith and attending Harvard University as an undergraduate student will enter his name as Joe Smith at 302, his status as an undergraduate student at 304, and his email address as jsmith@harvard.edu at 306. Joe Smith will enter a password at 308 (other than the password for his school email account), and will enter a randomly chosen word at 310 appearing near the bottom of the exemplary registration screen 300. The randomly chosen word may be used in exemplary embodiments to verify the registration information is being entered by a person, such as Joe Smith, and not by a computer. As part of the registration process, Joe Smith will also read and agree to the terms of use for the segmented community for Harvard University. To complete the registration process, Joe Smith will select a "Register Now!" option at 312 as displayed at the bottom of the exemplary screen shot 300.

Figure 4:
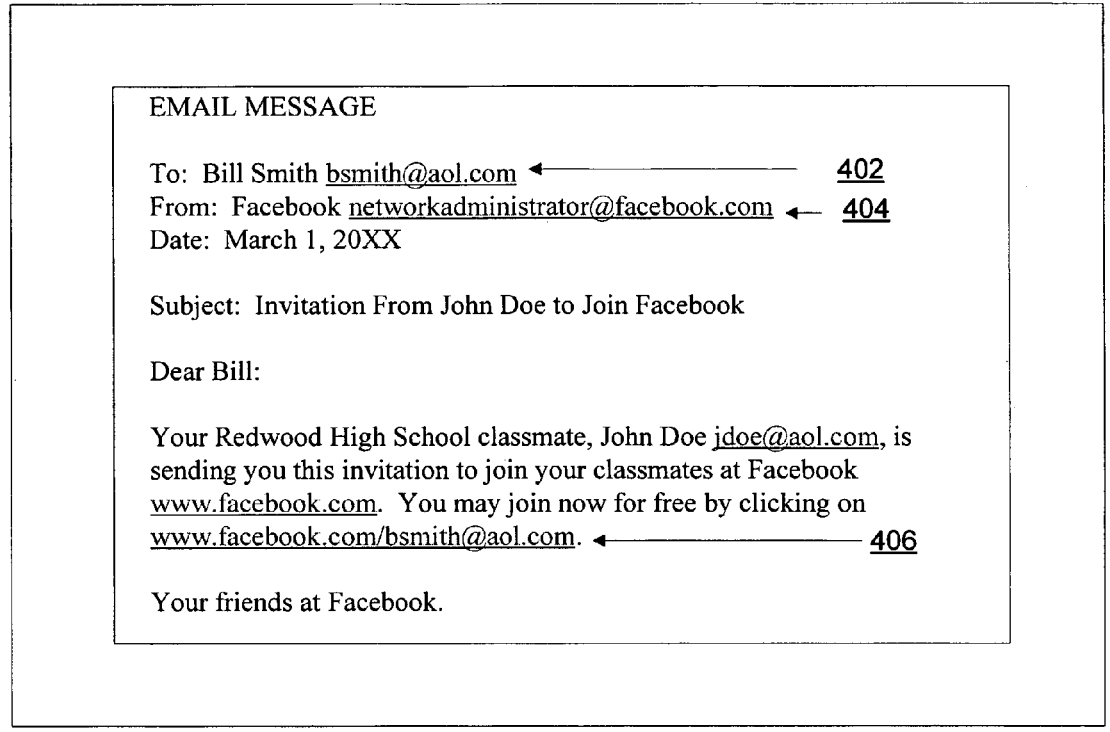
FIG. 4 shows an exemplary email invitation for joining a segmented community.

Turning to FIG. 4, an exemplary email invitation 400 for joining a segmented community is shown. The exemplary email invitation 400 is one authentication mechanism used for web-based users to join a segmented community as authenticated segmented community members. For example, in FIG. 4, a member of a segmented community named John Doe has invited non-member Bill Smith to join the segmented community for people affiliated with Redwood High School. John Doe generated the email invitation 400 while logged-in to the segmented community for Redwood High School. The exemplary email invitation 400 was sent to Bill Smith at his third party email address 402.

John Doe, in connection with his membership, is subject to the terms of use for the segmented community for Redwood High School. According to some embodiments, the terms of use can require John Doe to only invite people affiliated with Redwood High School to join the segmented community. In further embodiments, the terms of use can require segmented community members to report to a network administrator such as network administrator 404, any user suspected of not belonging to a particular segmented community. Violators of the terms of use can be subjected to elimination from a particular segmented community.

Returning to the example shown in FIG. 4, Bill Smith is instructed to activate a link 406 contained on the exemplary email invitation 400 if he wishes to join the segmented community for users affiliated with Redwood High School. By Bill Smith activating link 406, he will be directed to a registration screen such the exemplary registration screen 300 (FIG. 3). When Bill Smith accesses the registration screen, the network administrator 404 will associate a specific Internet Protocol ("IP") address with Bill Smith, based on the computer used by Bill Smith to complete the registration process. By the network administrator 404 associating a specific IP address with Bill Smith, Bill Smith's affiliation with Redwood High School is authenticated.

Figure 5:
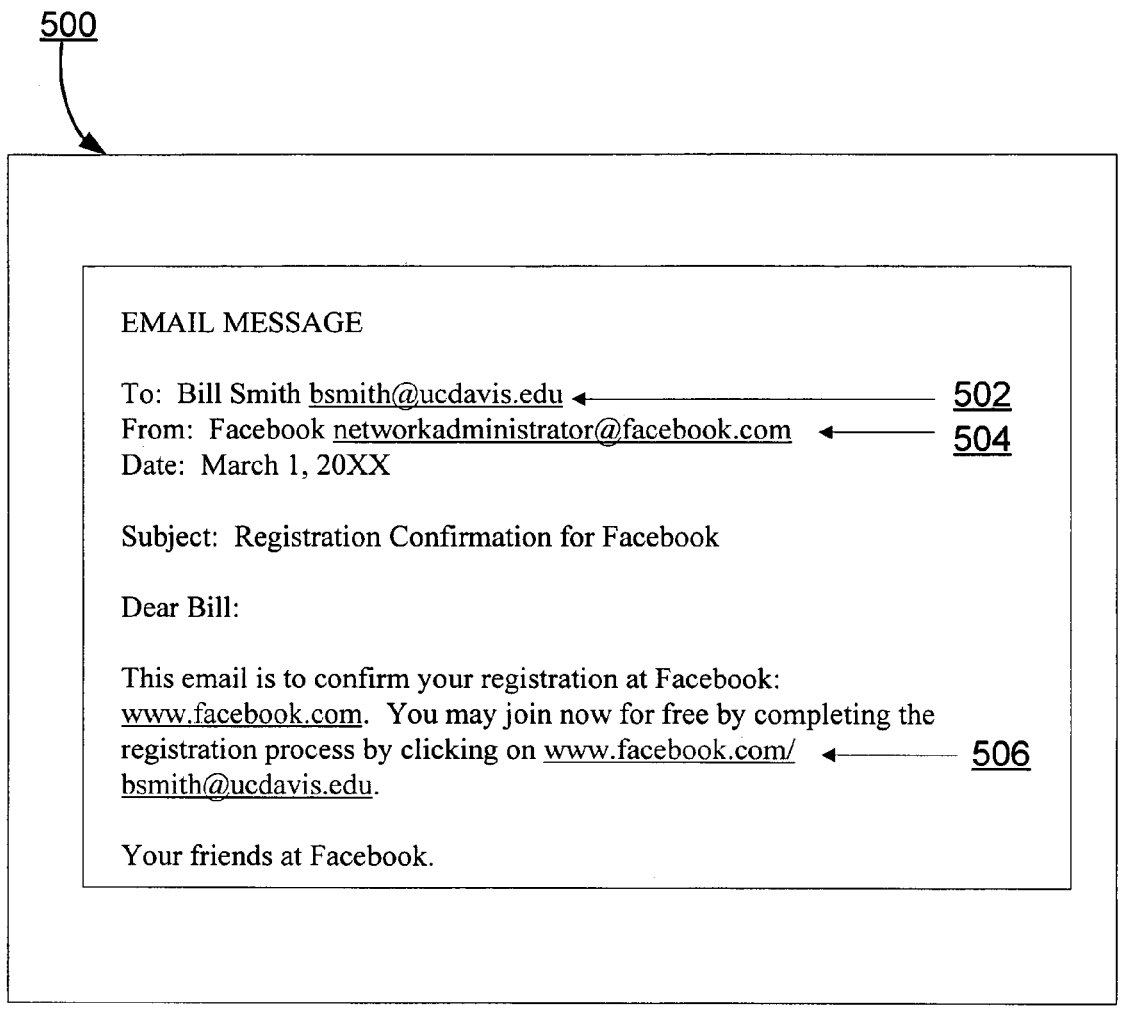
FIG. 5 shows an exemplary email registration confirmation for a segmented community.

Turning to FIG. 5, an exemplary email registration confirmation 500 is shown. According to some embodiments, after a user having an email address with a TLD corresponding to the user's particular segmented community, such as an institution of higher learning (e.g. person@schoolname.edu), completes the registration process (described in connection with FIG. 3), the user will receive the exemplary email registration confirmation 500. The exemplary email registration confirmation 500 contains a link 506 to the particular segmented community the user wishes to join. The email registration confirmation 500 is sent from a server that hosts the particular segmented community. When the user accesses an email account corresponding to the email address 502 and activates the link 506 to the particular segmented community, the user's affiliation with a particular segmented community is authenticated.

For example, with reference to the exemplary email registration confirmation 500, Bill Smith, a student at U.C. Davis, has already completed and submitted a registration screen such as exemplary registration screen 300 to join a segmented community for people affiliated with U.C. Davis. In connection with completing the registration screen, Bill Smith entered his email address 502 for his email account at U.C. Davis. In the particular example illustrated in FIG. 5, Bill Smith entered bsmith@ucdavis.edu as his email address 502. In response, Bill Smith received the exemplary email registration confirmation 500 from a network administrator 504 for the segmented community.

Figure 6:
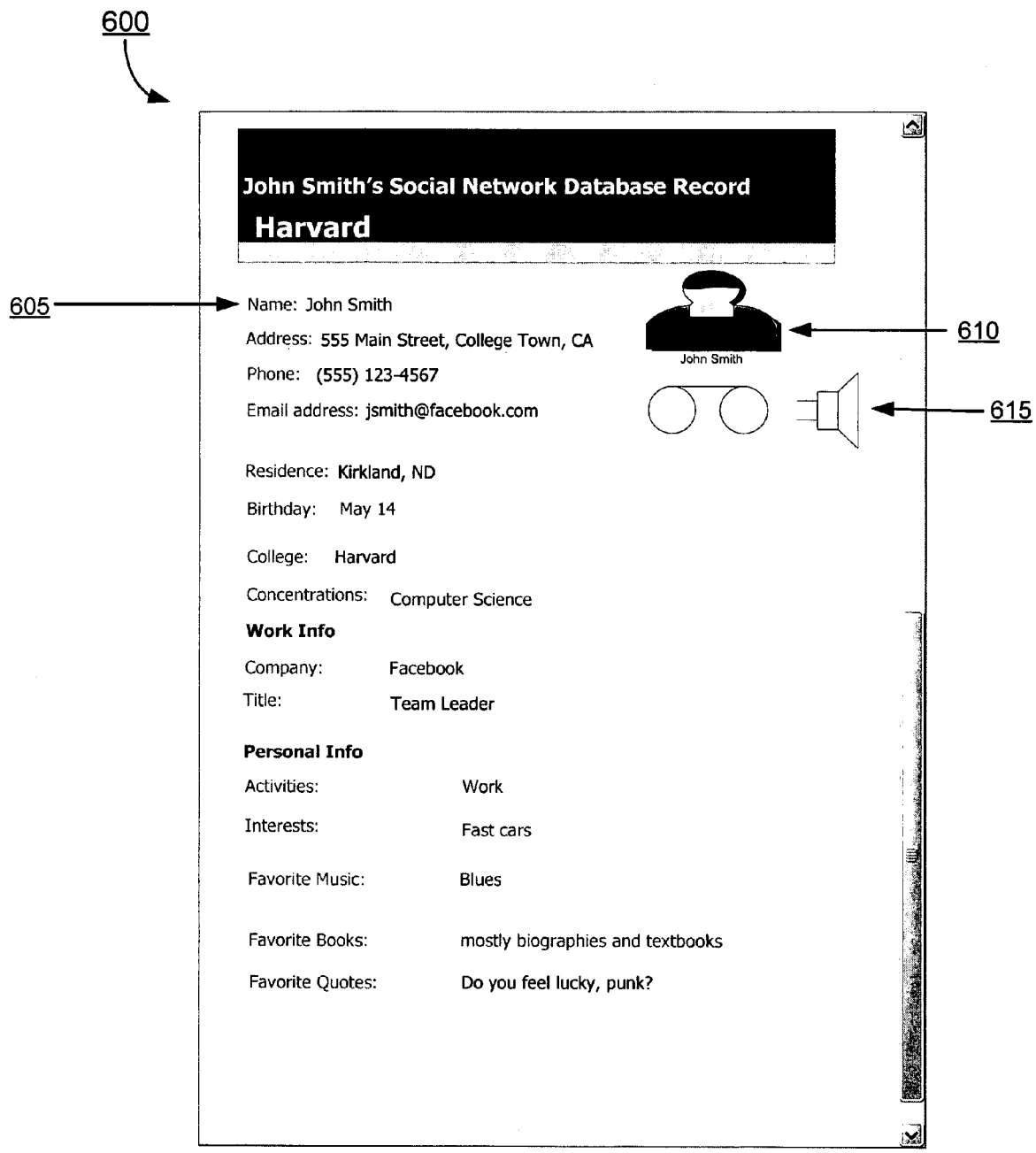
FIG. 6 shows a screen shot of an exemplary web-based social network database record.

In the exemplary email registration confirmation 500, Bill Smith is required to confirm his registration by activating the link 506 contained on the exemplary email registration confirmation 500. By activating the link 506, Bill Smith accesses a web-based social network database record, such as the exemplary web-based social network database record 600 (FIG. 6). At the same time, the network administrator 504 will associate a specific IP address with Bill Smith, based on the computer being used by Bill Smith to access the segmented community. As a result of this process, Bill Smith becomes an authenticated member of the segmented community for people associated with U.C. Davis.

FIG. 6 shows an exemplary screenshot of a web-based social network database record 600. The web-based social network database 104 (FIG. 1) comprises a plurality of web-based social network database records 600 configured to represent a segmented community, such as exemplary segmented community 200 (FIG. 2).

The social network database record 600 shown in FIG. 6 is for John Smith of Harvard University. The social network database record 600 includes John Smith's contact content 605, which includes expression content 610 and 615. According to various embodiments, contact content may include expression content, such as audio/video. Audio/video is any audio, video, audiovisual, pictorial, photograph, image form, text file, and/or all variations and combinations thereof. Contact content also includes other information in the web-based social network database 104. Information in the web-based social network database 104 may include information from a social map and/or a social timeline. A social map can be a display of the interactions, relationships and experiences of individuals or groups of individuals comprising the web-based social network database 104, as described in U.S. Provisional Patent Application Ser. No. 60/750,844 filed on Dec. 14, 2005 for "Systems and Methods for Social Mapping," and incorporated herein by reference. A social timeline in one embodiment is a chronological listing of a user selected subset of individuals comprising the web-based social network database 104 in categories such as coworkers, classmates, travel companions, hookups, classmates, summer/abroad friends, relationships and teammates, as described in U.S. Provisional Patent Application Ser. No. 60/753,810 filed on Dec. 23, 2005 for "Systems and Methods for Social Timeline," and incorporated herein by reference. The information in the social network database record 600 is entered and maintained by the particular contact who is the subject of the social network database record 600 (i.e., John Smith of Harvard University).

Turning to FIG. 7, a screen shot of an exemplary segmented community social network 700 according to various exemplary embodiments is shown. The exemplary segmented community social network 700 comprises a listing of members of a segmented community. Although the exemplary segmented community social network 700 comprises five randomly selected people from a member's segmented community, alternative exemplary embodiments of segmented community social networks may comprise more than five randomly selected members or less than five randomly selected members from a member's respective segmented community.

Exemplary segmented community social network 700 comprises a summary listing of contact content 605 (FIG. 6) for each displayed member. For example, with respect to the exemplary social network 700, contact content 605 for each displayed member includes the displayed member's name 702, the displayed member's status 704, the displayed member's field 706 (i.e., concentration, major or area of study), and the displayed member's picture 708 (if posted by the displayed member on the displayed member's web-based social network database record 600 (FIG. 6)).

FIG. 8 shows an exemplary flyer settings selections screen 800. A segmented community member uses the flyer settings selections screen 800 to select a variety of parameters for generating and displaying a segmented community flyer. Flyer settings selections component 116 (FIG. 1) is configured to receive flyer settings selections from a segmented community member as entered on the flyer settings selections screen 800.

A theme selection 802 is displayed in FIG. 8. Accordingly, a segmented community member may select from such various flyer settings selections as "Basic", "Birthday", "Graduation", "Housewarming", "Party", or "Other." If the segmented community member selects the "Basic" settings selection at theme selection 802, they will select a "plain" theme selection that is intended to accommodate most occasions. If the segmented community member selects the "Other" settings selection at theme selection 802, they will be prompted to type-in their own theme selection. The selected theme is incorporated into generation of a segmented community flyer.

In the exemplary flyer settings selections screen 800, a picture selection 804 is displayed. A segmented community member may select from various flyer settings selections as "Upload" or "No Picture." If the segmented community member selects the "Upload" settings selection, they will be prompted to upload a photo from their web-based social network database record 600 (FIG. 6) and/or from a digital storage device. The selected photo is incorporated into generation of a segmented community flyer.

The exemplary flyer settings selections screen 800 also features a title selection 806, a message body selection 808, a link selection 812, and an author selection 814. Title selection 806 offers a segmented community member with an option to enter a title for a segmented community flyer. Message body selection 808 offers a segmented community member an option to enter a message to be incorporated into a segmented community flyer. Link selection 812 offers a segmented community member an option to enter an html locator link to a particular destination on the World Wide Web. If the segmented community member enters an html locator link at link selection 812, the html locator link will be incorporated into a segmented community flyer as a highlighted link. A segmented community member viewing a segmented community flyer can use the highlighted link to access such destinations as a website on the World Wide Web that features such information as concert dates, product details or additional information about a particular segmented community member. Author selection 814 offers a segmented community member an option to incorporate the segmented community member's name into a segmented community flyer as an author or posting party of the segmented community flyer.

The exemplary flyer settings selection screen 800 shown in FIG. 8 shows a flyer preview screen 810, according to one embodiment. The flyer preview screen 810 allows a segmented community member to preview in the flyer preview screen 810 a display of a segmented community flyer based on flyer settings selections made by the segmented community member. According to one embodiment, a segmented community member can preview a display of a segmented community flyer in flyer preview screen 810 after making one or more selections for a segmented community flyer with flyer selection screen 800. In another embodiment, a segmented community member can preview a display of a segmented community flyer in flyer preview screen 810 after making all of the selections for a segmented community flyer with flyer selection screen 800. Further, a segmented community member may elect to skip previewing a segmented community flyer and proceed to the next step.

The exemplary flyer settings selection screen 800 features a segmented community display selection 816. In the one embodiment shown in FIG. 8, the community display selection 816 illustrates a segmented community comprising a school and requests addition/removal of other schools or segmented communities where a segmented community member may wish to post or display the segmented community flyer.

According to various embodiments, the segmented community display selection 816 offers a segmented community member a number of various flyer settings selections for selecting one or more segmented communities to receive display of a particular segmented community flyer. According to one embodiment, segmented community display selection 816 offers a segmented community member flyer settings selections for selecting one or more segmented community members, groups of segmented community members or specialized sub-groups of segmented community members (e.g. "friends" and/or "friends of friends") to receive display of a particular segmented community flyer. In further embodiments, segmented community display selection 816 offers a segmented community member flyer settings selections for selecting segmented community members of one or more segmented communities wherein selected segmented community members share a particular interest. For example, segmented community display selection 816 may offer segmented community display selections that include segmented community members who indicate an interest in a particular rock band, field of study or hobby as reflected on web-based social network database records of segmented community members.

The segmented community display selection 816 also offers a segmented community member flyer settings selections for selecting a number of displays for a segmented community flyer. For example, according to one embodiment, a segmented community member can use the segmented community display selection 816 to select to display a particular segmented community flyer 30,000 times or displays within a selected segmented community or segmented communities during a predetermined number of days.

The exemplary flyer settings selection screen 800 features a display date selection 818. The display date selection 818 offers a segmented community member with a number of flyer settings selections for when a particular segmented community flyer will be displayed. For example, according to one embodiment, a segmented community member can select at display date selection 818 to start display of a segmented community flyer on a particular day at a particular time and to stop display at a particular day at a particular time. According to another embodiment, a segmented community member can select at display date selection 818 to display a segmented community flyer on a particular day of the week during certain predetermined hours.

The exemplary flyer settings selection screen 800 features a total price calculation 820. According to one embodiment, the total price calculation 820 reflects a calculated price that a segmented community member will pay for display of a segmented community flyer. In one embodiment, the total price is based on number of flyers, number of days the flyers are to be displayed, and a particular price per flyer quantity. Other various embodiments may utilize different and/or similar criteria to calculate a total price. In yet further embodiments, a segmented community member may be prompted to another screen and/or to another part of screen in which the segmented community member may pay for segmented community flyers to be displayed, using interfaces appreciated by those of ordinary skill in the art, such as PayPal™ or other similar interfaces, in which cash, debit, credit, barter, points, and/or membership status represent a basis for a transaction.

It will readily be appreciated by one of ordinary skill in the art that there are multiple possible variations of the exemplary flyer settings selection screen 800. For example, flyer settings selections involving data entry and/or flyer settings selections other than those shown in the exemplary flyer settings selection screen 800 may be implemented and still fall within the scope of various embodiments. According to some embodiments, the flyer settings selection component 116 accesses a web-based social network database 104 (FIG. 1) in order to provide certain flyer settings selections tailored for a particular segmented community member. For instance, the flyer settings selections component 116 may insert a particular segmented community name from web-based social network database 104 into the flyer settings selections.

Figure 9:
FIG. 9 shows an exemplary segmented community flyer.

Referring now to FIG. 9, an exemplary segmented community flyer 900 is shown. According to one embodiment, a segmented community flyer generator component 120 (FIG.

1) utilizes the received flyer settings selections in the flyer settings selections component 116 (FIG. 1) to generate segmented community flyer 900. The segmented community flyer generator component 120 then forwards the generated segmented community flyer 900 to a flyer display component 122 (FIG. 1) to display the segmented community flyer 900 to one or more segmented communities. According to further embodiments, the segmented community flyer 900 can be displayed to members of selected segmented communities for a predetermined number of displays commencing at a predetermined time.

According to various embodiments, exemplary segmented community flyer 900 is displayed at various intervals or times while a segmented community member is viewing content associated with a segmented community. For instance, exemplary segmented community flyer 900 may be displayed at various intervals while being located in close proximity to a web-based social network database record, such exemplary web-based social network database record 600. In a different embodiment, exemplary segmented community flyer 900 may be displayed while being located in close proximity to a segmented community social network, such as exemplary segmented community social network 700. In yet a further embodiment, exemplary segmented community flyer 900 is displayed while a segmented community member is not viewing content associated with a segmented community. For instance, a segmented community flyer, such as exemplary segmented community flyer 900, may be displayed either by itself or with non-segmented community-related content on a screen of a device such as a mobile phone or other similar device.

It will readily be appreciated by one of ordinary skill in the art that there are multiple possible variations of the exemplary segmented community flyer 900. For example, various shapes, sizes and presentation styles (e.g. fade-in/fade-out, flashing, sounds, voice and/or music) may be implemented and still fall within the scope of various embodiments.

Figure 10:
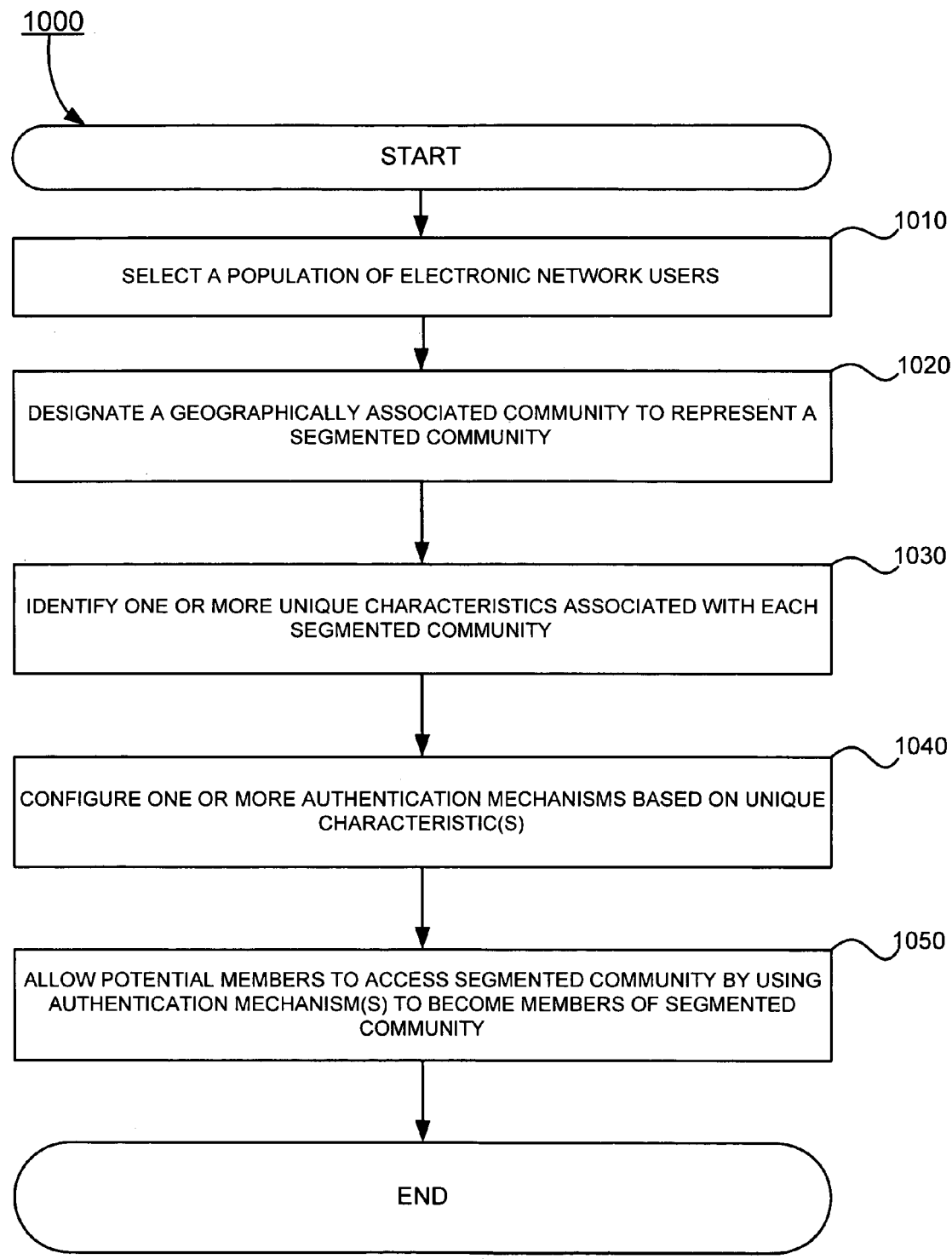
FIG. 10 shows a flowchart for an exemplary method of establishing a segmented community.

Turning to FIG. 10, a flowchart for one exemplary method 1000 of establishing a segmented community such as exemplary segmented community 200 (FIG. 2) is shown.

At step 1010, a population of web-based users is selected. According to various embodiments, a population of web-based users comprises all undergraduate students, graduate students, professional students, faculty, staff and/or alumni (or any combination thereof) of all universities and colleges, who have access to a networked computer.

Other exemplary populations include all high school students, faculty, staff (or any combination thereof) of all high schools, who have access to a networked computer.

An alternative exemplary population includes all employees of a multi-national corporation who have access to a networked computer.

Yet a further exemplary population includes all residents of all cities in the United States who have access to a networked computer.

At step 1020, a geographically associated community within the population is designated to represent a segmented community, such as the exemplary segmented community 200 (FIG. 2). In exemplary embodiments, the undergraduate students, graduate students, professional students, faculty, staff and/or alumni (or any combination thereof of a particular institution of higher learning that have access to a networked computer is a geographically associated community that represent a segmented community.

In other exemplary embodiments, the students, faculty, and/or staff of a particular high school who have access to a networked computer is a geographically associated community that represent a segmented community.

In alternative exemplary embodiments, the employees of a particular office of a multi-national corporation who have access to a networked computer is a geographically associated community that represent a segmented community.

In yet further exemplary embodiments, the residents of a particular city in the United States who have access to a networked computer is a geographically associated community that represent a segmented community.

At step 1030, one or more unique characteristics associated with each segmented community are determined. For example, with respect to a segmented community for Harvard University, the TLD of harvard.edu is a unique characteristic.

At step 1040, an authentication mechanism is configured for each segmented community based on the one or more unique characteristics associated with each segmented community (as identified at step 1030). In exemplary embodiments, an authentication mechanism can be requiring a person for a particular segmented community for people affiliated with a particular institution of higher learning to access an email account hosted on a server belonging to the particular institution of higher learning. When the email account is accessed, the person is required to activate a link contained on an email sent by a network administrator for the particular segmented community.

In alternative exemplary embodiments, the person is required to send a reply email to the network administrator.

In yet a further exemplary embodiment, the person is required to activate a link contained on an email sent by a previously authenticated member of the segmented community.

At step 1050, potential members of the segmented community access the segmented community by using the one or more authentication mechanisms. Upon using the one or more authentication mechanisms to successfully access the segmented community, the potential members are now members of the segmented community.

Figure 11:
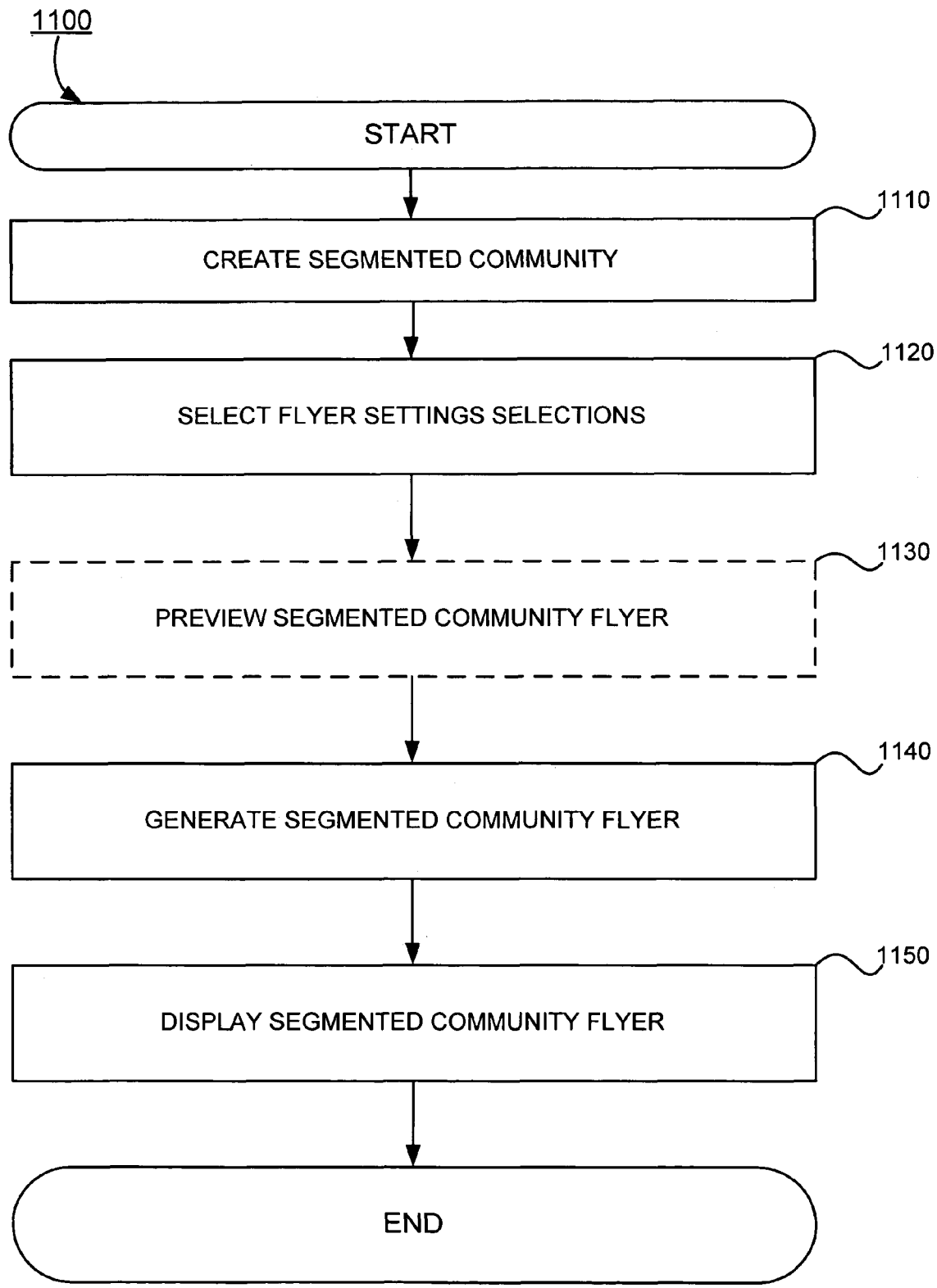
FIG. 11 shows a flowchart for an exemplary method of generating a segmented community flyer.

FIG. 11 illustrates a flow diagram of an exemplary method 1100 for dynamically generating a segmented community flyer.

At step 1110, a segmented community is established. Segmented community flyers are predicated upon segmented communities. A segmented community is established by exemplary method 1000 as shown in FIG. 10 (above).

At step 1120, one or more segmented community flyer setting selections are received from a segmented community member. According to one embodiment, a segmented community member enters the segmented community flyer setting selections via a flyer settings selections screen such as exemplary flyer settings selections screen 800 (FIG. 8).

At step 1130, the segmented community flyer is previewed. Once the flyer settings selections are made by a segmented community member, the flyer preview component 118 creates a preview of a segmented community flyer for the segmented community member. According to some embodiments, a segmented community member may elect to skip this step.

At step 1140, a segmented community flyer is generated based on the flyer settings selections received from the segmented community member at step 1120. According to one embodiment, a segmented community flyer generator component 120 (FIG. 1) utilizes the received flyer settings selections in the flyer settings selections component 116 (FIG. 1) to generate a segmented community flyer, such as exemplary segmented community flyer 900 (FIG. 9).

At step 1150, a segmented community flyer is displayed. According to one embodiment, a segmented community flyer generator component 120 forwards a generated segmented community flyer 900 to a flyer display component 122 (FIG. 1) for display to one or more segmented communities. According to further embodiments, the segmented community flyer 900 can be displayed to members of selected segmented communities for a predetermined number of displays commencing at a predetermined time.

While various embodiments have been described above, it should be understood that they have been presented by way of example only, and not limitation. For example, any of the elements associated with the segmented community flyers may employ any of the desired functionality set forth hereinabove. Thus, the breadth and scope of a preferred embodiment should not be limited by any of the above-described exemplary embodiment

What is claimed is:

1. A system for dynamically generating a segmented community flyer comprising:
    a server configured with a social network database, the database storing:
        a plurality of social network database records representing one or more segmented communities, each segmented community defined within a social networking system, and
        information for tracking affiliations of a plurality of users of the social networking system with one or more of the segmented communities; and
    a segmented community flyer settings engine coupled to the web-based social network database, the segmented community flyer settings engine comprising:
        a flyer settings selection component configured to receive one or more flyer settings selections for a segmented community flyer and payment for a limited distribution of the segmented community flyer from a member of a selected segmented community,
        a flyer generator component configured to generate a segmented community flyer for the segmented community based on the one or more flyer settings selections, and
        a flyer display component configured to display a plurality of the generated flyers to other members of the selected segmented community in accordance with the received flyer settings selections until the limited distribution has been reached.

2. The system of claim 1, wherein the segmented community flyer settings engine generates the segmented community flyer for a second segmented community.

3. The system of claim 2, further comprising the segmented community flyer settings engine configured to display the segmented community flyer to two segmented communities.

4. The system of claim 1, wherein the segmented community further comprises a web-based social network database record for each member of the segmented community.

5. The system of claim 1, wherein the limited distribution comprises a period of time during which the segmented community flyers are displayed.

6. The system of claim 1, wherein the limited distribution comprises a maximum number of segmented community flyers to be displayed.

7. A method for dynamically generating a segmented community flyer comprising:
    establishing one or more segmented communities, each segmented community defined within a social networking system;
    tracking affiliations of a plurality of users of the social networking system with one or more of the segmented communities;
    receiving one or more flyer settings selections for a segmented community flyer and payment for a limited distribution of the segmented community flyer from a member of a selected segmented community;
    generating, by a computer system, a segmented community flyer based on the one or more flyer settings selections; and
    displaying a plurality of the generated flyers to other members of the selected segmented community in accordance with the received flyer settings selections until the limited distribution has been reached.

8. The method recited in claim 7, further comprising previewing the segmented community flyer incorporating the one or more flyer settings selections.

9. The method recited in claim 7, wherein the segmented community flyer comprises an html link.

10. The method recited in claim 7, further comprising selecting a date on which the segmented community flyer is to be displayed.

11. The method recited in claim 7, further comprising displaying the segmented community flyer to a second segmented community.

12. The method of claim 7, wherein the limited distribution comprises a period of time during which the segmented community flyers are displayed.

13. The method of claim 7, wherein the limited distribution comprises a maximum number of segmented community flyers to be displayed.

14. A computer program embodied on a computer readable medium having instructions for dynamically generating a segmented community flyer comprising:
    establishing one or more segmented communities, each segmented community defined within a social networking system;
    tracking affiliations of a plurality of users of the social networking system with one or more of the segmented communities;
    receiving one or more flyer settings selections for a segmented community flyer and payment for a limited distribution of the segmented community flyer from a member of a selected segmented community;
    generating, by a computer system, a segmented community flyer based on the one or more flyer settings selections; and
    displaying a plurality of the generated flyers to other members of the selected segmented community in accordance with the received flyer settings selections until the limited distribution has been reached.

15. The computer program recited in claim 14, further comprising previewing the segmented community flyer incorporating the one or more flyer settings selections.

16. The computer program recited in claim 14, wherein the segmented community flyer comprises an html link.

17. The computer program recited in claim 14, further comprising selecting a date in which the segmented community flyer is to be displayed.

18. The computer program recited in claim 14, further comprising displaying the segmented community flyer to a second segmented community.

19. The computer program of claim 14, wherein the limited distribution comprises a period of time during which the segmented community flyers are displayed.

20. The computer program of claim 14, wherein the limited distribution comprises a maximum number of segmented community flyers to be displayed.

* * * * *